United States Patent
Chen et al.

(10) Patent No.: US 9,008,706 B2
(45) Date of Patent: Apr. 14, 2015

(54) METHOD AND APPARATUS FOR IMPLEMENTING NETWORK COGNITION

(71) Applicant: Huawei Technologies Co., Ltd., Shenzhen, Guangdong (CN)

(72) Inventors: Jie Chen, Shenzhen (CN); You Li, Chengdu (CN); Lei Gong, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 309 days.

(21) Appl. No.: 13/632,286

(22) Filed: Oct. 1, 2012

(65) Prior Publication Data

US 2013/0029705 A1    Jan. 31, 2013

Related U.S. Application Data

(63) Continuation of application No. PCT/CN2011/073208, filed on Apr. 23, 2011.

(30) Foreign Application Priority Data

May 12, 2010   (CN) .......................... 2010 1 0175706

(51) Int. Cl.
   *H04B 7/00*     (2006.01)
   *H04W 16/14*    (2009.01)
   *H04W 88/18*    (2009.01)

(52) U.S. Cl.
   CPC .............. *H04W 16/14* (2013.01); *H04W 88/18* (2013.01)

(58) Field of Classification Search
   CPC .................................................. H04W 16/14
   USPC ................... 455/501, 434, 454, 67, 11, 67.13
   See application file for complete search history.

(56) References Cited

U.S. PATENT DOCUMENTS

| | | | | |
|---|---|---|---|---|
| 7,742,764 | B2* | 6/2010 | Gillig et al. | 455/434 |
| 8,326,313 | B2* | 12/2012 | McHenry et al. | 455/454 |
| 2007/0204325 | A1* | 8/2007 | Cameron et al. | 726/1 |

(Continued)

FOREIGN PATENT DOCUMENTS

| CN | 1852576 | 10/2006 |
|---|---|---|
| CN | 101146336 | 3/2008 |

(Continued)

OTHER PUBLICATIONS

John Strassner et al., "Introducing Reconfigurability and Cognitive Networks Concepts in the Wireless World", Jun. 2006, pp. 32-39.

(Continued)

*Primary Examiner* — Sanh Phu
(74) *Attorney, Agent, or Firm* — Staas & Halsey LLP (57) ABSTRACT

The present invention discloses a method and an apparatus for implementing network cognition. The method includes: determining a type of a received network task; according to the type of the received network task, selecting at least one cognitive capability identifier corresponding to the type of the network task; using network devices with the at least one cognitive capability identifier as alternative network devices; determining an alternative network device that is among the alternative network devices and has a cognitive capability that meets a condition for performing the network task is a target network device; and controlling the target network device to perform the network task.

10 Claims, 8 Drawing Sheets

(56) References Cited

U.S. PATENT DOCUMENTS

| | | |
|---|---|---|
| 2008/0233991 A1 | 9/2008 | Gillig et al. |
| 2009/0054095 A1 | 2/2009 | Corke et al. |
| 2009/0149208 A1 | 6/2009 | Huttunen et al. |

FOREIGN PATENT DOCUMENTS

| | | |
|---|---|---|
| CN | 101505540 | 8/2009 |
| RU | 2375826 C2 | 12/2009 |
| WO | 03/092231 A1 | 11/2003 |
| WO | WO 2009/139500 A1 | 11/2009 |

OTHER PUBLICATIONS

"IEEE Standard Definitions and Concepts for Dynamic Spectrum Access: Terminology Relating to Emerging Wireless Networks, System Functionality, and Spectrum Management", IEEE Communication Society, Sep. 2008, pp. 1-47.

"Reconfigurable Radio Systems (RRS); Functional Architecture (FA) for the Management and Control of Reconfigurable Radio Systems", ETSI TR 102 682 V1.1.1, Jul. 2009, pp. 1-45.

Ozgur B. Akan et al., "Cognitive Radio Sensor Networks", Aug. 2009, pp. 34-40.

Extended European Search Report issued Feb. 4, 2013, in corresponding European Patent Application No. 11780120.9.

International Search Report, dated Aug. 4, 2011, in corresponding International Application No. PCT/CN2011/073208 (3 pp.).

Written Opinion of the International Searching Authority, dated Aug. 4, 2011, in corresponding International Application No. PCT/CN2011/073208 (3 pp.).

International Search Report of PCT/CN2011/073208 mailed Aug. 4, 2011.

Chinese Office Action mailed Jul. 1, 2013 in corresponding Chinese Application No. 201010175706.3.

Russian Office Action dated Nov. 24, 2014 in corresponding Russian Patent Application No. 2012153556.

* cited by examiner

| Cognitive capability Level | Cognitive capability | | |
|---|---|---|---|
| | Sensing capability | Learning capability | Reconfiguration capability |
| Level 0 | ○ | ○ | ○ |
| Level 1 | ○ | ○ | ● |
| Level 2 | ○ | ● | ○ |
| Level 3 | ○ | ● | ● |
| Level 4 | ● | ○ | ○ |
| Level 5 | ● | ○ | ● |
| Level 6 | ● | ● | ○ |
| Level 7 | ● | ● | ● |

| Sensing capability S | Learning capability L | Reconfiguration capability R |
|---|---|---|
| Sensing sensitivity (S0) | Supported learning algorithm (L1) | Software reconfiguration (R1) |
| Sensed frequency band range (S1) | | Hardware reconfiguration (R2) |
| Sensible access technology (S2) | | |
| Supported sensing algorithm (S3) | | |
| Supported sensing mechanism (S4) | | |

METHOD AND APPARATUS FOR IMPLEMENTING NETWORK COGNITION

CROSS-REFERENCE TO RELATED APPLICATIONS

This application is a continuation of International Application No. PCT/CN2011/073208, filed on Apr. 23, 2011, which claims priority to Chinese Patent Application No. 201010175706.3, filed on May 12, 2010, both of which are hereby incorporated by reference in their entireties.

FIELD OF THE INVENTION

The present invention relates to the telecommunication field, and in particular, to a method and an apparatus for implementing network cognition.

BACKGROUND OF THE INVENTION

CR (Cognitive Radio, cognitive radio) is currently the most promising technology to settle the insufficiency of spectral resources. Research shows that a large number of currently fixed-allocated spectra are not fully utilized, resulting in huge waste of spectral resources. The cognitive radio can detect these idle frequency bands through cognition of the radio spectral environment, and dynamically access these frequency bands without interfering in a PU (Primary User, primary user), thereby improving the utilization rate of spectra. From the aspect of conception, a cognitive capability of the cognitive radio refers to a capability to adjust its configuration parameters by learning the environment in real time to adapt to the current radio communication environment.

In the process of implementing the present invention, the inventor finds that: a radio communication network includes various terminals such as a MS (Mobile Station, mobile station) and UE (User Experience, user experience), various access devices such as a BTS (Base Transceiver Station, base transceiver station), a Node B (mobile base station), an eNode B (evolved Node B, evolved Node B), and an AP (Access Point, access point), and various network devices such as an MSC (Mobile Switching Center, mobile switching center). Differences in cognitive capabilities exist among these devices. Some devices possess the cognitive capabilities while some devices do not possess the cognitive capabilities. Even for devices that possess cognitive capabilities, the specific cognitive capabilities they possess are different in some degree. Because these devices are different in cognitive capabilities, when they are used to implement a task or function on a network, these cognitive capability differences bring differences in the specific implementation of the task or function, resulting in certain risks in the process of implementing a network task by network devices, and leading to failure to execute the network task.

SUMMARY OF THE INVENTION

Embodiments of the present invention provide a method and an apparatus for implementing network cognition. The specific solutions are described as follows:

An embodiment provides a method for implementing network cognition, including:
  determining a type of a received network task;
  according to the type of the received network task, selecting at least one cognitive capability identifier corresponding to the type of the network task, where the cognitive capability identifier is configured to identify a cognitive capability of a network device;
  using network devices with the at least one cognitive capability identifier as alternative network devices;
  determining that an alternative network device that is among the alternative network devices and has a cognitive capability that meets a condition for performing the network task is a target network device; and
  controlling the target network device to perform the network task.

An embodiment provides an apparatus for implementing network cognition, including:
  a determining unit, configured to determine a type of a received network task;
  a cognitive capability identifier selecting unit, configured to: according to the type of the received network task, select at least one cognitive capability identifier corresponding to the type of the network task, where the cognitive capability identifier is configured to identify a cognitive capability of a network device;
  an alternative device selecting unit, configured to use network devices with the at least one cognitive capability identifier as alternative network devices;
  a target device selecting unit, configured to determine that an alternative network device that is among the alternative network devices and has a cognitive capability that meets a condition for performing the network task is a target network device; and
  a controlling unit, configured to control the target network devices to perform the network task.

A technical solution in the preceding solutions has the following advantage: as the method for identifying the cognitive capability of the network device is used, a difference between network devices can be clearly embodied, which solves the problem in the prior art that the cognitive capabilities among network devices are not clear and risks exist in the process of selecting a network device for performing a network task, and further achieves an objective that a device that meets the network task condition is selected according to the cognitive capability identifiers of different devices to complete the network task.

DETAILED DESCRIPTION OF THE EMBODIMENTS

The technical solutions in the embodiments of the present invention are described clearly and completely below with reference to accompanying drawings in the embodiments of the present invention. Evidently, the embodiments described below are only part rather than all of the embodiments of the present invention. All other embodiments obtained by those skilled in the art without creative efforts based on the embodiments of the present invention fall within the protection scope of the present invention.

The present invention discloses a method for implementing network cognition. By identifying cognitive capabilities of network devices, it may be judged, according to the cognitive capabilities of different devices, whether the network devices need to perform a network task, and a device that meets a network task condition is selected for implementing the network task, which ensure that the network task is smoothly completed.

The network task in the present invention indicates one or a combination of a sensing task, a decision task, and a reconfiguration task. The cognitive capabilities required for completing a network task include three types of capabilities: sensing, learning, and reconfiguration. The sensing capability refers to a capability to identify the peripheral radio environment and find an idle and available spectrum. The learning capability refers to a capability to perform adaptive processing according to a change of the radio environment. The reconfiguration capability refers to a capability to re-configure a parameter, software and so on according to the change of the radio environment. Types and levels of cognitive capabilities and specific cognitive capability parameters which are possessed by different network devices are different. The following describes each of the cognitive capabilities in detail.

On an actual communication network, a certain device may possess a cognitive capability or may not possess a cognitive capability. On an actual network, parameters for measuring the specific sensing capability include sensing sensitivity, a sensed frequency band range, a sensible access technology, a supported sensing algorithm, and a supported sensing mechanism. All these parameters need to be transferred as one IE (Information Element, information element) on the network.

The sensing sensitivity is related to the hardware capability of a device, and refers to a capability that the device can detect a signal with certain strength. Lower strength of the signal that can be detected indicates higher sensing sensitivity.

The sensed frequency band range mainly refers to a range of frequency bands that can be sensed by the device and apparatus. This index is related to the hardware capability or logical hardware capability of the device. A wider range of frequency bands that can be sensed and more available frequency band resources that can be sensed indicate a higher sensing capability of the device in this aspect.

The sensible access technology mainly refers to a access system of a signal that can be sensed by the device, for example, sensing one or more types of signals of systems such as GSM, IS-95CDMA and so on in 2G, WCDMA, CDMA2000, TD-SCDMA, WiMAX and so on in 3G, and Wi-Fi. More access systems of signals that can be sensed indicates a higher sensing capability of the device in this aspect. The sensible access technology can be used to embody differences of sensing capabilities between devices. For example, some device can sense only one type of radio access signal (such as one type of radio access signal in 2G and 3G, or a Wi-Fi signal), while some device can detect two or more types of radio access signals.

The supported sensing algorithm mainly indicates the sensing processing capability of the device. For example, some device may support a blind detection algorithm (such as energy detection), while some device may support a signal feature detection algorithm (such as matched filter detection). Specifically, some device may not support detection in which a signal is distinguished, while some device may support detection in which a signal can be distinguished. different sensing algorithms supported by different devices may be used to embody the differences of sensing capabilities.

The supported sensing mechanism mainly refers to whether the device supports a collaborated sensing mechanism, and if the collaborated sensing mechanism is supported, whether a corresponding message transmission mechanism exists and which fusion algorithm is supported.

The differences of sensing capabilities may be embodied according to sensing mechanisms supported by different devices. For example, some device supports a collaborated mechanism while some device does not.

The learning capability is measured through a learning algorithm parameter supported by the device. These algorithms include: fuzzy logic, genetic algorithm, evolutionary algorithm, and reinforcement learning. Problems and objectives in different application scenarios may be implemented by using different learning algorithms. A larger number of learning algorithms supported by a device indicates a stronger capability, that is, learning capability, of the device to adapt to the environment, and a larger value of the learning algorithm parameter. On an actual network, parameters for measuring the possession of the learning capability and for measuring the learning capability may be transferred as one IE on the network.

The reconfiguration capability is mainly measured by parameters such as hardware reconfiguration and software reconfiguration capabilities of a certain device. Hardware configuration mainly includes reconfiguration of hardware parameters (such as a radio frequency parameter), and software reconfiguration mainly includes protocol reconfiguration (such as access system reconfiguration). On an actual network, indexes for measuring the possess of the reconfiguration capability and for measuring the reconfiguration capability may be transferred as one IE on the network.

Based on the preceding theoretical basis, the implementation of the present invention is as shown in the following embodiments:

Embodiment 1

Figure 1:
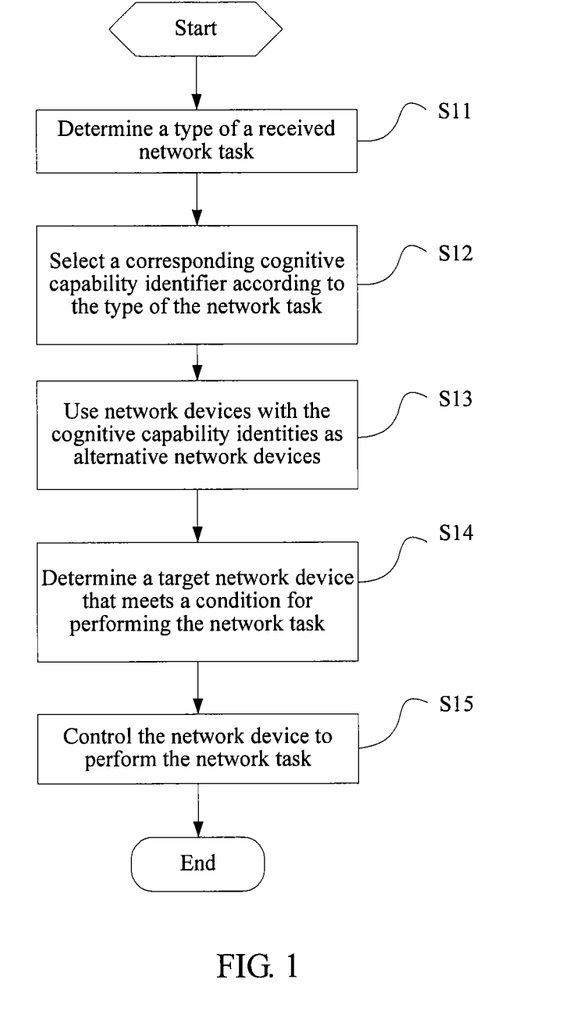
FIG. 1 is a flowchart of a method for implementing network cognition according to a first embodiment of the present invention.

FIG. 1 is a flowchart of a method for implementing network cognition according to a first embodiment of the present invention, including:

Step S11: Determine a type of a received network task.

Determine whether the network task currently required to be completed is a sensing task, decision task, or reconfiguration task, or is a combination of any two of the three task types, or includes all of the three task types.

Step S12: According to the type of the received network task, select at least one cognitive capability identifier corresponding to the type of the network task, where the cognitive capability identifier is configured to identify a cognitive capability of a network device.

Identify the cognitive capability of each network device. The cognitive capability of each of terminals, access devices, and network devices may be represented by a parameter or an information element. Different cognitive identifiers are used to represent different cognitive capabilities and are provided for the network as a basis for selecting, when different tasks or functions need to be implemented, network devices to complete the tasks or functions. A same network device may have a plurality of cognitive capability identifiers, each of which has a different form, and the cognitive capability identifiers identify the cognitive capability of the network device from different respective aspects. When the cognitive capability identifier is selected according to the network task type, one or more cognitive capability identifiers corresponding to the network task type may be selected according to the needs of the current network task. Supposing the current network task to be performed is a sensing task, one or more cognitive capability identifiers possessing the sensing capability identifiers may be selected in this case.

Step S13: Use network devices with the at least one cognitive capability identifier as alternative network devices.

Suppose that the result determined in step S12 is that the network task is a sensing task. In this step, according to the fact that the network task type is the sensing task, select a network device that possesses a sensing capability identifier corresponding to the sensing task type, and use all the network devices that possess sensing capability identifiers as alternative network devices.

Step S14: Determine that a alternative network device that is among the alternative network devices and has a cognitive capability that meets a condition for performing the network task is a target network device.

On an actual communication network, a certain device may possess the cognitive capability or may not possess the cognitive capability. Levels and parameters of cognitive capabilities that are possessed by different devices are different even if they possess cognitive capabilities. about it is required to be judged, according to specific needs of the network task, whether the cognitive capability of an alternative network device meets the requirement of a network task. Only the network device that meets the requirement can be determined to be the target network device to perform the network task. If the condition for performing the network task is simple, for example, it is required only that a corresponding cognitive capability is possessed, all alternative network devices can be determined to be target network devices in this step according to the result of the preceding step. However, if the condition for performing the network task is strict, for example, in addition to the requirement for the cognitive capability type of the network device, there further is a requirement for the level and parameter of the cognitive capability, the level and parameter of the network device need to be measured in this step according to the actual needs, and the network device that meets the condition for performing the network task is determined to be the target network device.

Step S15: Control the target network device to perform the network task.

Through the preceding method, the cognitive capability of the network device is identified, the differences of cognitive capabilities between various network devices are clearly embodied, the type of the cognitive capability possessed by the network device is judged through a cognitive identifier, and then it is judged whether the network device can participate in the network task, so that the objective of completing the network task is achieved.

Embodiment 2

Figure 2:
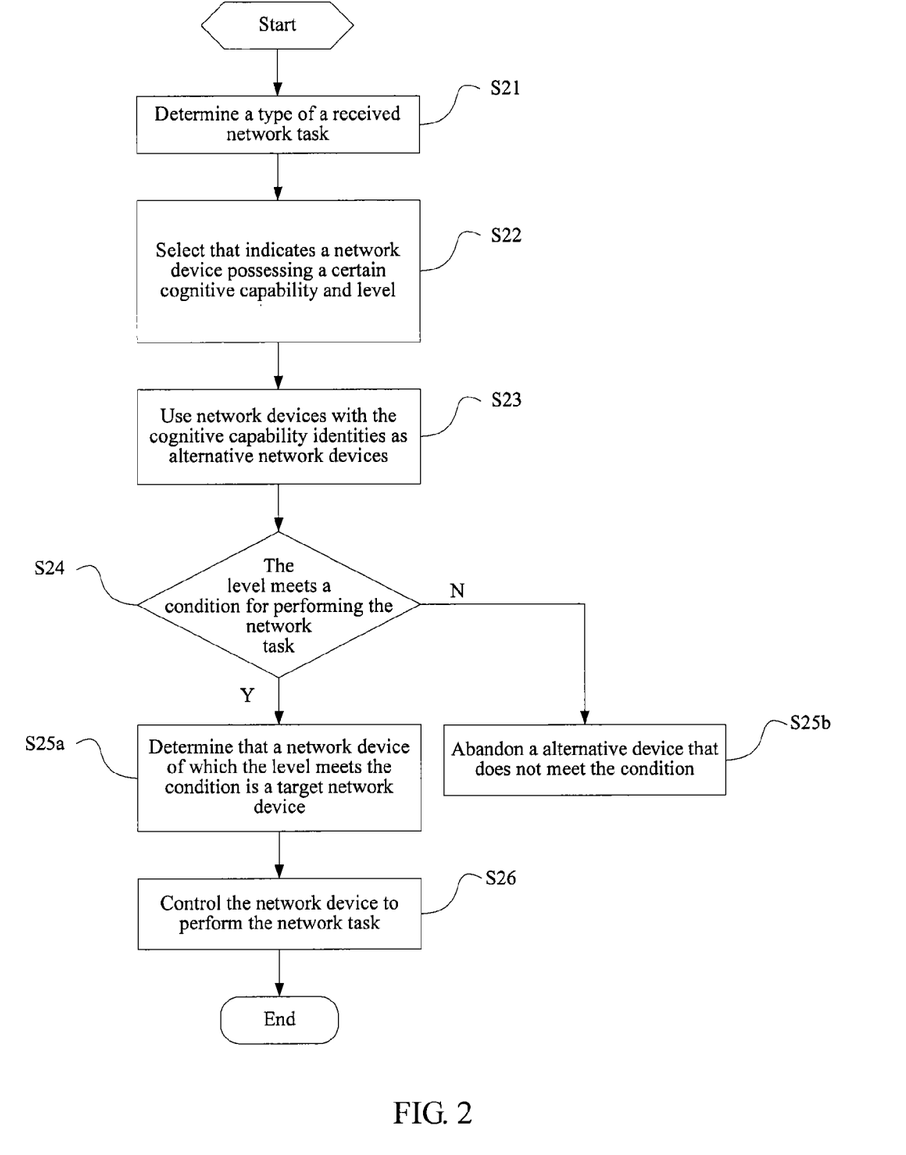
FIG. 2 is a flowchart of a method for implementing network cognition according to a second embodiment of the present invention.

In a method for implementing network cognition disclosed in the second embodiment, a case in which a network task is a sensing task is taken for example for describing the process of the method, and its procedure is as shown in FIG. 2, including:

Step S21: Determine a type of a received network task.

The result of determination is the sensing task.

Step S22: According to the type of the received network task, select at least one cognitive capability identifier corresponding to the type of the network task, where the cognitive capability identifier is configured to identify a cognitive capability of a network device.

Figure 3:
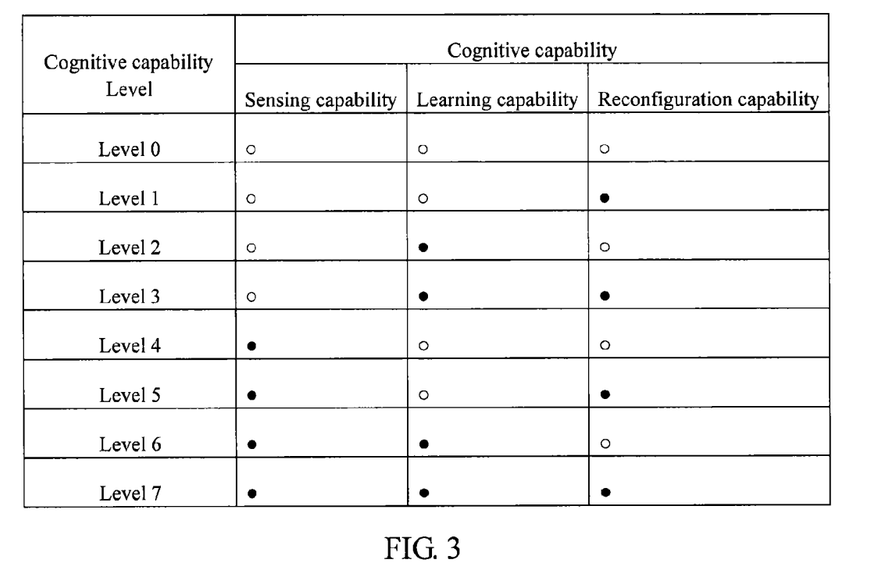
FIG. 3 is a schematic diagram of a network device identifier according to the second embodiment of the present invention.

The network device identifier selected in this step can indicate a certain cognitive capability and level possessed by the network device, and its schematic diagram is as shown in FIG. 3. A solid circle indicates that the device has the cognitive capability of this item, and an empty circle indicates that the device does not have the cognitive capability of this item. Other forms may also be adopted to indicate the possession of the cognitive capability. For example, a check is used to indicate that the device has the cognitive capability of this item, and a cross is used to indicate that the device does not have the cognitive capability of this item. As shown in FIG. 3, if a certain network device does not possess any cognitive capability, the corresponding cognitive capability level is 0. If the network device possesses a reconfiguration capability only, its cognitive capability level is 1. If the network device possesses a learning capability only, its cognitive capability level is 2. If the network device possesses both the reconfiguration capability and the learning capability, its cognitive capability level is 3. The rest can be deduced through analogy. Then, when the network device possesses a sensing capability, the learning capability, and the reconfiguration capability, its cognitive capability level is the highest, that is, 7. The higher the level is, the more cognitive capability types the network device possesses, and the more complicated the network task that can be completed by the network device is. As the current network task is the sensing task, a cognitive capability identifier with the sensing capability is selected.

Step S23: Use network devices with the at least one cognitive capability identifier as alternative network devices.

According to the result in step S21, a network device with the sensing capability identifier needs to be selected, according to the type of the network task, as the alternative network device. As shown in FIG. 3, a network device with a cognitive capability identifier indicating that the network device possesses a certain cognitive capability and level, and with the cognitive capability level ranging from 4 to 7, needs to be selected as the alternative network device.

Step S24: Judge, according to the cognitive capability identifier that indicates that the network device possesses a certain cognitive capability and level, whether the cognitive capability level of the alternative network device meets a condition for performing the network task; if yes, perform step S25a; if no, perform step S25b.

If the condition for the network task is possessing a sensing capability identifier and have a cognitive capability level of at least 6 to complete the task, alternative network devices are filtered through the judgment process.

Step S25a: Determine that the alternative device is a target network device.

After filtering, network devices with cognitive capability levels being 6 and 7 are selected.

Step S25b: Abandon an alternative device that does not meet the condition.

Abandon network devices with cognitive capability levels being 4 and 5.

Step S26: Control the target network device to perform the network task.

Control target network devices with cognitive capability levels being 6 and 7 to perform the network task.

In this embodiment, the sensing task is taken for example, by acquiring a preset cognitive capability identifier that indicates that the network device possesses a certain cognitive capability and level, it is judged whether the network device possesses the cognitive capability corresponding to the sensing task type, and then it is judged, according to the cognitive capability level identified in the cognitive capability identifier, whether the network device meets the condition for performing the network task, and the network device that meets the condition is selected to perform the network task. This manner avoids a problem that a network task fails because the cognitive capability of a selected network device does not meet the requirement of the network task, and improves the network working efficiency.

Embodiment 3

Figure 4:
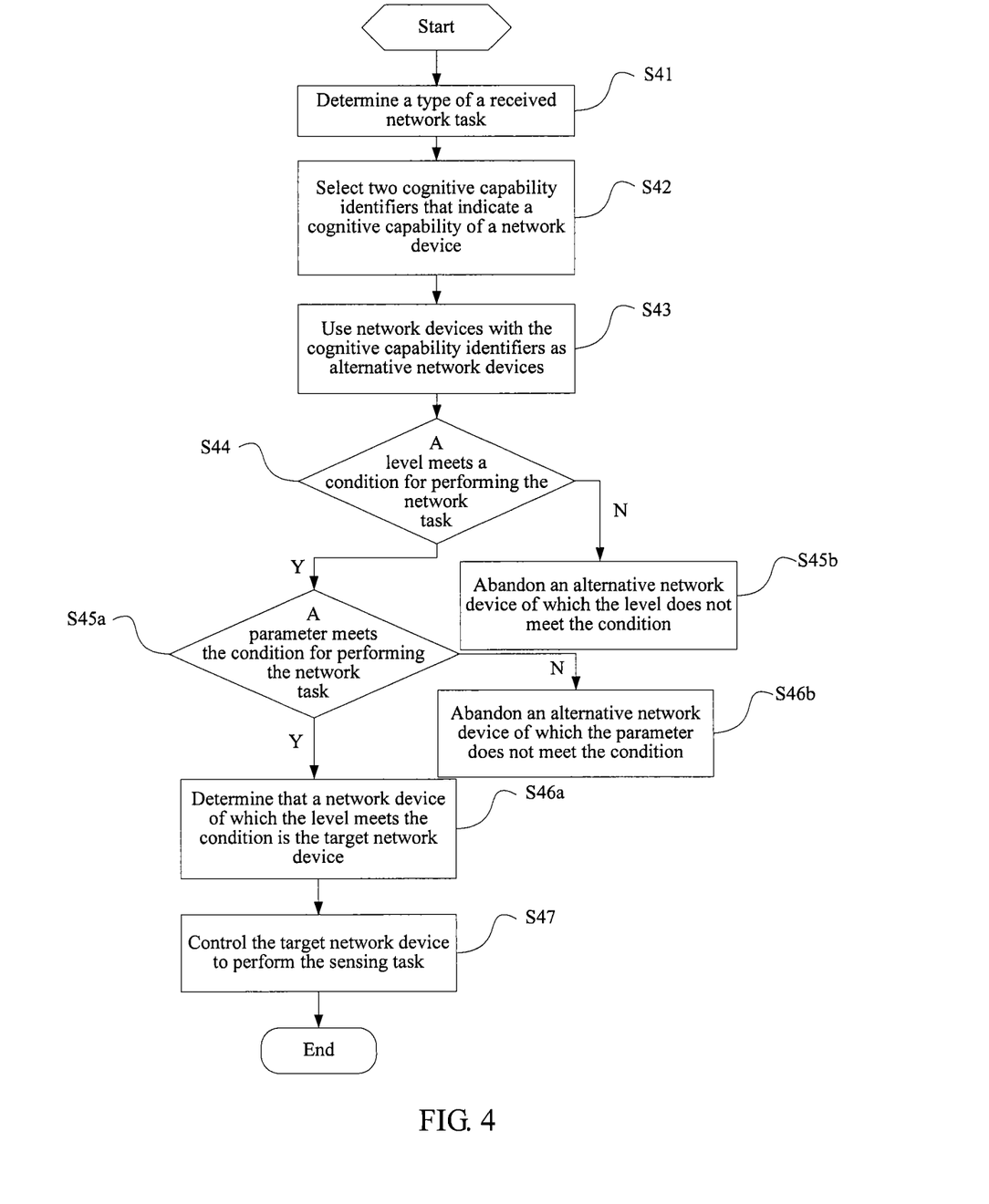
FIG. 4 is a flowchart of a method for implementing network cognition according to a third embodiment of the present invention.

In this embodiment, a case that a network task is a sensing task is still taken for example to further describe the method. Its procedure is as shown in FIG. 4, including:

Step S41: Determine that a type of a received network task is the sensing task.

The network task in this embodiment is still the sensing task, that is, a task for identifying the surrounding radio environment and then sensing whether an idle and available spectrum exist.

Step S42: Select two cognitive capability identifiers corresponding to the type of the network task, where the cognitive capability identifiers are configured to identify cognitive capabilities of a network device.

The cognitive capability identifiers selected in this embodiment include: an identifier indicating that the network device possesses a certain cognitive capability and level, and an identifier indicating cognitive capability parameter value possessed by the network device.

Figure 5:
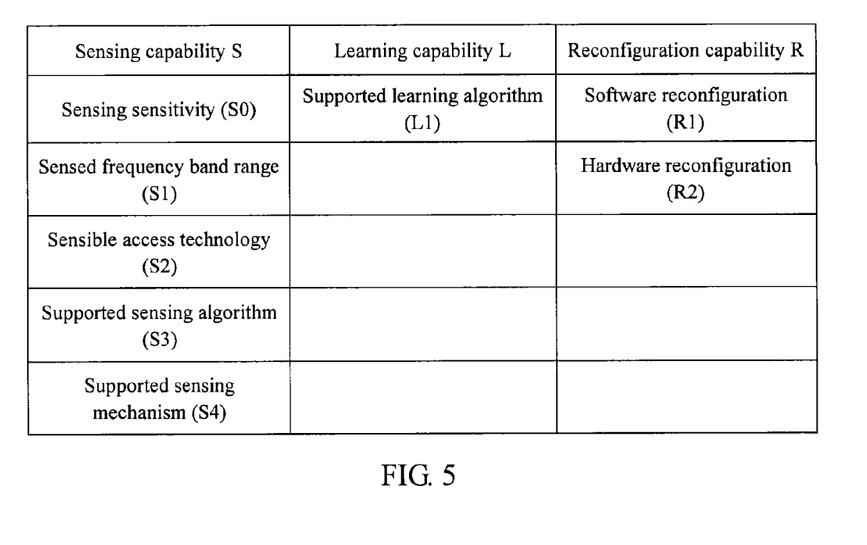
FIG. 5 is a schematic diagram of another network device identifier according to the third embodiment of the present invention.

Among the cognitive capability identifiers acquired in this embodiment, in addition to the identifier indicating a certain cognitive capability and level in the preceding embodiment, an identifier indicating cognitive capability parameter value possessed by the network device is further included, that is, an identifier that further details the cognitive capability of the network device. Its schematic diagram is as shown in FIG. 5, specific parameters in a sensing capability, a learning capability, and a reconfiguration capability possessed by the network device are indicated separately. Different identifiers represent parameter values of different cognitive capabilities. For example, a sensed frequency band range being S1 indicates that the corresponding sensed frequency band range is 100 to 100 MHz, and a supported learning algorithm being L1 indicates that the supported learning algorithm is a fuzzy logic algorithm. This identification form is more specific than the identification form in the second embodiment. When in the requirement of the network task, only a network device that performs the network task is required to have a certain level of cognitive capability, the requirement may be implemented through the identification form in the second embodiment. When the requirement of the network task are more specific, however, supposing it is required that the sensed frequency band range of the network device that performs the network task is 50 to 500 MHz, the identification form in the second embodiment cannot satisfy this stricter requirement. Therefore, the identifier indicating the cognitive capability parameter value possessed by the network device in this embodiment needs to be used.

The form specifically selected for identification may be determined according to the requirement of the actual network task. When according to the requirement of the network task, it is required only to determine whether the network device possesses a certain, or two certain, or three certain cognitive capabilities and their levels, only the cognitive capability identifiers disclosed in the second embodiment need to be acquired. After it is determined that the device possesses a certain, two certain, or three certain cognitive capabilities, when these cognitive capabilities possessed by the device need to be specifically measured, the cognitive capability identifiers disclosed in this embodiment may be acquired separately. When a specific cognitive capability possessed by the device needs to be determined, the cognitive capability identifiers of these two forms may be acquired at the same time as described in this embodiment.

Step S43: Use network devices with the two cognitive capability identifiers as alternative network devices.

Use the network devices with the preceding two cognitive capability identifiers and the sensing capability as the alternative network devices.

Step S44: Judge, according to the cognitive capability identifier that indicates that the network device possesses a certain cognitive capability and level, whether the cognitive capability level of the alternative network device meets a condition for performing the network task; if yes, perform step S45a; if no, perform step S45b.

Suppose that the condition for the network task is that the cognitive capability level is 6. Then a network device with the cognitive capability level being 6 is selected from the alternative network devices in this step.

Step S45a: Judge, according to the cognitive capability identifier indicating the cognitive capability parameter value possessed by the network device, whether the cognitive capability parameter value of the alternative network device meets the condition for performing the network task; if yes, perform step S46a; if no, perform step S46b.

If the condition for the network task is that the sensed frequency band range of the network device is from 50 to 500 MHz, find, according to the cognitive capability identifier indicating the cognitive capability parameter value possessed by the network device, a network device with the sensed frequency band range parameter value in the sensing capability being S1, to use the network device as a target network device.

Step S45b: Abandon a network device that does not meet the cognitive capability level.

Abandon network devices with cognitive capability levels being 4, 5, and 7.

Step S46a: Determine that the alternative device is the target network device.

Determine that the network device with the cognitive capability level being 6 and the sensed frequency band parameter value being S1 is the target network device.

Step S46b: Abandon a network device of which a cognitive capability parameter value does not meet the condition for the network task.

Step S47: Control the target network device to perform the network task.

In this embodiment, in addition to that the cognitive capability level of network devices needs to be judged, the sensing capability of the network device needs to be analyzed in detail the value or values of one or more of parameters such as perception sensitivity, a sensed frequency band range, a sensible access technology, a supported sensing algorithm, and a supported sensing mechanisms are measured, it is judged, according to these parameter values, whether the capability of the network device to find an idle spectrum in the surrounding radio environment meets the condition for this sensing task, and when its parameter values meet the condition for the sensing task it is determined that the network device is the target network device for performing the sensing task. The method disclosed in this embodiment details the process of determining target devices, avoiding a case that a network task fails because the parameter value of the network device does not meet the condition for the network task.

Embodiment 4

Figure 6:
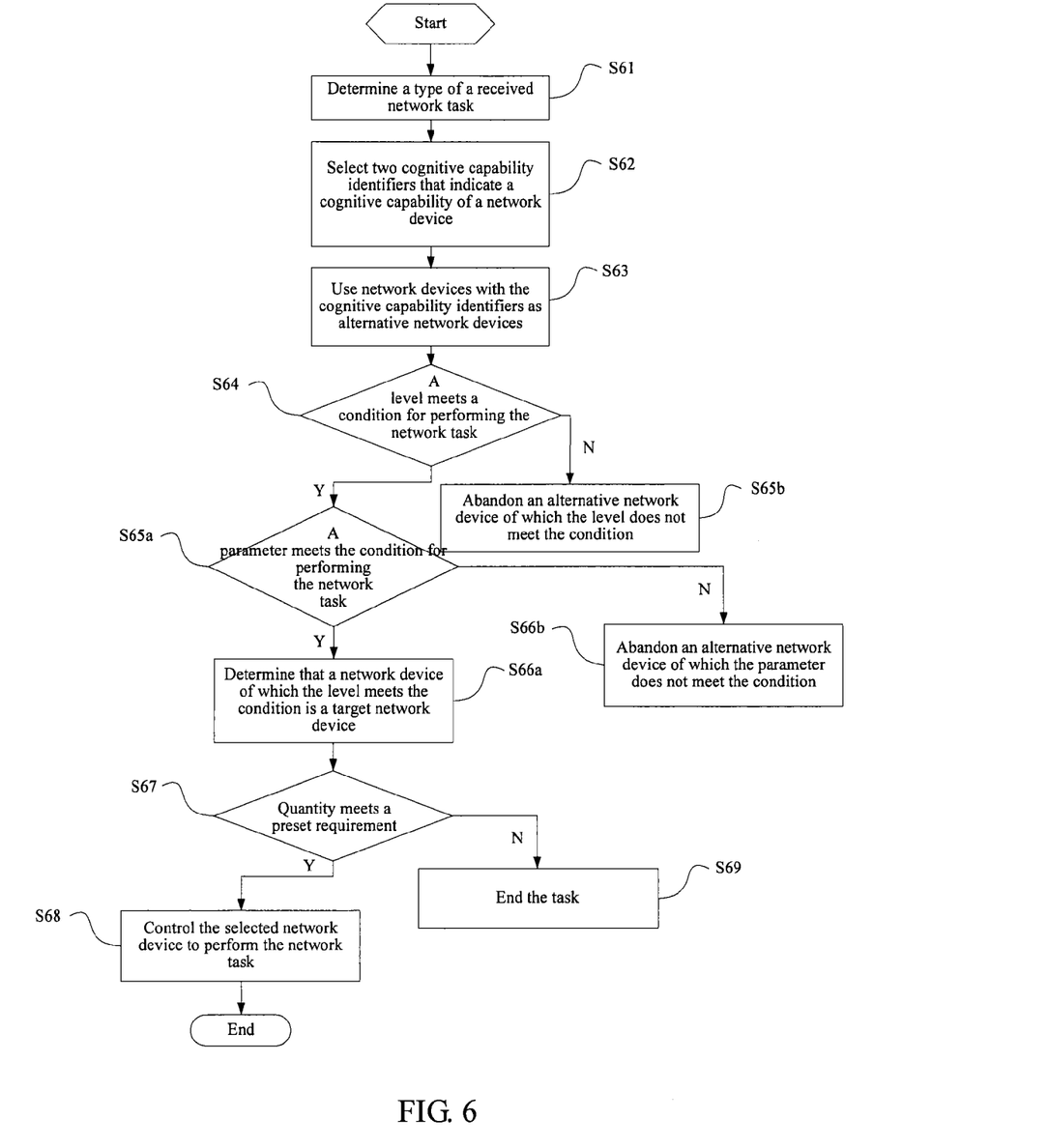
FIG. 6 is a flowchart of a method for implementing network cognition according to a fourth embodiment of the present invention.

A procedure of a method for implementing network cognition disclosed in a fourth embodiment of the present invention is as shown in FIG. 6, including:

Step S61: Determine a type of a received network task.

The network task in this embodiment is still a sensing task, that is, to identify the surrounding radio environment to further sense whether an idle and available spectrum exist.

Step S62: Select at least one cognitive capability identifier corresponding to the type of the network task, where the cognitive capability identifier is configured to identify a cognitive capability of a network device.

In this embodiment, two cognitive capability identifiers described in the preceding embodiment are selected.

Step S63: Use network devices with the at least one cognitive capability identifier as alternative network devices.

Set the network devices that meet the preceding condition as the alternative network devices.

Step S64: Judge, according to the cognitive capability identifier that indicates that the network device possesses a certain cognitive capability and level, whether the cognitive capability level of the alternative network device meets a condition for performing the network task; if yes, perform step S65a; if no, perform step S65b.

Suppose that the condition for the network task is that the cognitive capability level is 7. Then a network device with a cognitive capability level being 7 is selected from the alternative network devices in this step.

Step S65a: Judge, according to the cognitive capability identifier indicating the a cognitive capability parameter value of the network device, whether the cognitive capability parameter value of the alternative network device meets the condition for performing the network task; if yes, perform step S66a; if no, perform step S66b.

If the condition for the network task is that the sensed frequency band range of the network devices is from 500 to 1000 MHz, find, according to the cognitive capability identifier indicating the cognitive capability parameter value of the network device, a network device with the sensed frequency band range parameter value in the sensing capability being S2, to use the network device as a target network device.

Step S65b: Abandon a network device that does not meet the cognitive capability level.

Abandon network devices whose cognitive capability levels are 4, 5, and 6.

Step S66a: Determine that the alternative devices is the target network device.

Determine that a network devices with a cognitive capability level being 7 and the sensed frequency band parameter value being S2 is the target network device.

Step S66b: Abandon a network device of which a cognitive capability parameter value does not meet the condition for the network task.

Step S67: Judge whether a quantity of the target network devices satisfies a preset requirement; if yes, perform step S68; if no, perform step S69.

This step further judges the quantity of the target network devices that are selected to perform the sensing task. Supposing the quantity of the target network devices that satisfies the requirement of the sensing task is 5 and the quantity of current target network devices that are selected to perform the task is 5 or larger than 5, it is indicated that the selected network devices can perform the sensing task, and the subsequent operation is continued. If the quantity of the current target network devices that are selected to perform the task is smaller than 5, the selected network devices cannot perform the sensing task.

Step S68: Control the selected network device to perform the network task.

Step S69: Stop the network task.

In the method for implementing network cognition disclosed in this embodiment, the process of detecting the quantity of the target network devices for performing the network task is added, avoiding a problem that the network task fails to be performed because of a small quantity of target network devices.

Embodiment 5

Figure 7:
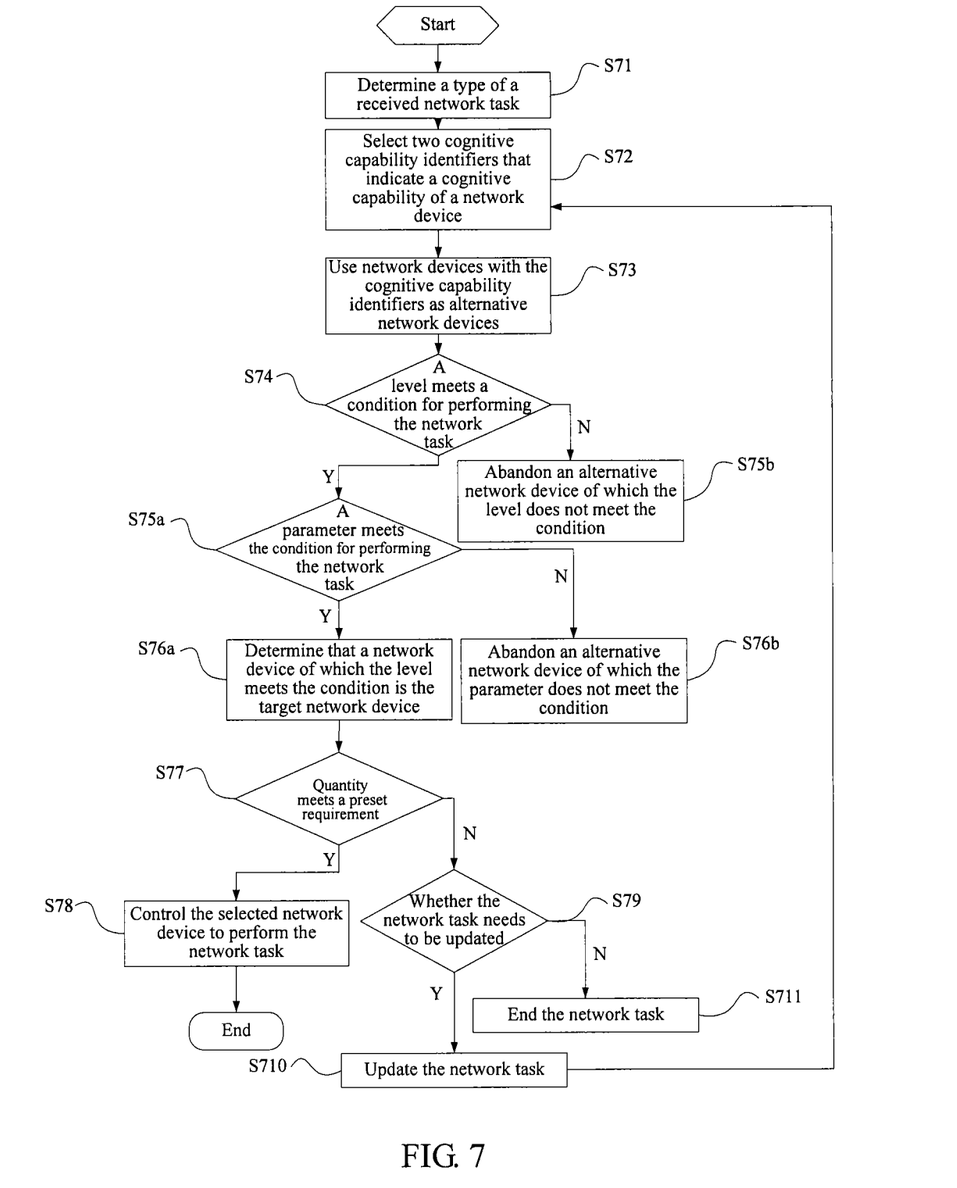
FIG. 7 is a flowchart of a method for implementing network cognition according to a fifth embodiment of the present invention.

A procedure of a method for implementing network cognition disclosed in the fifth embodiment of the present invention is as shown in FIG. 7, including:

Step S71: Determine a type of a received network task.

The network task in this embodiment is still a sensing task.

Step S72: Select at least one cognitive capability identifier corresponding to the type of the network task, where the cognitive capability identifier is configured to identify a cognitive capability of a network device.

In this embodiment, two cognitive capability identifiers described in the preceding embodiment are selected.

Step S73: Use network devices with the at least one cognitive capability identifier as alternative network devices.

Set the network devices that meet the preceding condition to be the alternative network devices.

Step S74: Judge, according to a cognitive capability identifier that indicates that the network device possesses a certain cognitive capability and level, whether the cognitive capability level of the alternative network device meets a condition for performing the network task; if yes, perform step S75a; if no, perform step S75b.

Step S75a: Judge, according to a cognitive capability identifier indicating a cognitive capability parameter value of the network device, whether the cognitive capability parameter value of the alternative network device meets the condition for performing the network task; if yes, perform step S76a; if no, perform step S76b.

Step S75b: Abandon a network device that does not meet the cognitive capability level.

Step S76a: Determine that the alternative device is a target network device.

Step S76b: Abandon a network devices of which a cognitive capability parameter value does not meet the condition for the network task.

Step S77: Judge whether a quantity of the target network devices satisfies a preset requirement; if yes, perform step S78; if no, perform step S79.

Step S79: Judge whether the network task needs to be updated; if yes, perform step S710; if no, perform step S711.

Judge whether the current network task needs to be updated so that the network task may be performed by using existing network devices on the network.

Step S710: Update the network task, and perform step S72.

A specific update operation may be set according to a actual situation. For example, the required quantity of sensing devices is reduced by prolonging sensing time or increasing sensing times, so that the currently selected network devices for performing the sensing task satisfy the requirement of the updated network task for the quantity of sensing devices and then can perform the network task. For example, prolonging the sensing time is to prolong the time of a network device identifying the surrounding radio environment, or increasing sensing times is to sense the surrounding radio environment for a plurality of times by using the current network device. An adjective of reducing the required quantity of sensed devices is achieved by adjusting the sensing time and sensing times. For example, the current network task requires ten network devices with the sensing capability to sense the surrounding environment once for ten minutes. However, if the quantity of network devices that satisfy the current requirement is only five, the sensing time of the network task may be updated to twenty minutes, or the sensing times of the network task may be updated to twice, and thereby, the current five network devices may be enabled to complete the work of ten network devices and complete the network task.

Step S711: Stop the network task.

In the method for implementing network cognition disclosed in this embodiment, a case that the target network device does not meet the condition for performing the network task is further described. When the selected target network device cannot satisfy the condition for performing the network task, the current network task may be ended to wait for the next task, or the current network task may be automatically updated by changing the condition required for performing the current network task, for example, prolonging the sensing time or increasing the sensing times, to lower the requirement for the quantity of the target network devices or other requirement by changing the condition of the network task itself, so that the network devices on the current network may perform the network task, which improves the working efficiency of network cognition.

In the method for implementing network cognition disclosed in the present invention, when the type of the network task is a combination of any two of or all of the sensing task, a decision task, and a reconfiguration task, the method for implementing network cognition is the same as the method described in the preceding embodiment. The condition required by each type of network task needs to be considered comprehensively, and network devices are filtered according to this condition to find the network device for implementing network tasks of a plurality of types.

Figure 8:
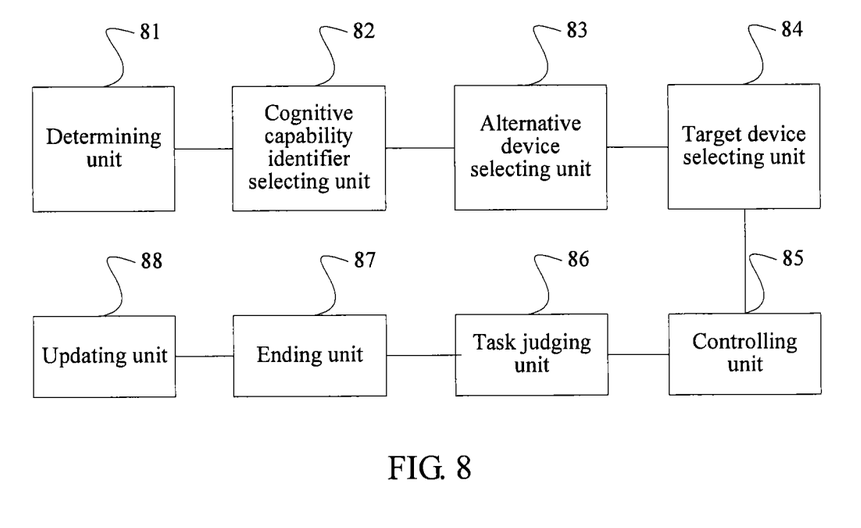
FIG. 8 is a schematic structural diagram of an apparatus for implementing network cognition according to an embodiment of the present invention.

The present invention further discloses an apparatus for implementing network cognition. FIG. 8 shows its structure. The apparatus includes: a determining unit 81, a cognitive capability identifier selecting unit 82, an alternative device selecting unit 83, a target device selecting unit 84, and a controlling unit 85. The determining unit 81 is configured to determine a type of a received network task; the cognitive capability identifier selecting unit 82 is configured to: according to the type of the received network task, select at least one cognitive capability identifier corresponding to the type of the network task, where the cognitive capability identifier is configured to identify a cognitive capability of a network device; the alternative device selecting unit 83 is configured to use network devices with the at least one cognitive capability identifier as alternative network devices; the target device selecting unit 84 is configured to determine that an alternative network device that is among the alternative network devices and has a cognitive capability that meets a condition for performing the network task is a target network device; and the controlling unit 85 is configured to control the target network device to perform the network task.

The apparatus further includes: a task judging unit 86, an ending unit 87, and an updating unit 88. The task judging unit 86 judges, when the cognitive capability identifier of the alternative network device does not meet the condition for performing the network task, whether the network task needs to be updated; the ending unit 87 is configured to end the network task when the network task does not need to be updated; the updating unit 88 is configured to update the network task when the network task needs to be updated.

All embodiments in this specification are described in a progressive manner. Each embodiment emphasizes the difference from other embodiments. For the similar parts between all embodiments, reference is made to each other. As for the apparatus disclosed in the embodiment, it corresponds to the method disclosed in the embodiments, and therefore, is simply described. For the associated part, reference may be made to the illustration in the method parts.

Those skilled in the art can further notice that the units and steps of algorithms in each example described in the embodiments disclosed in this document can be implemented by electronic hardware, computer software, or a combination of the both. To clearly illustrate the changeability of the hardware and software, the composition and steps of each example are generally described according to functions in the preceding illustration. Whether these functions are executed in a hardware or software manner depends on the specific applications and design constraints of the technical solution. Those skilled in the art can use different methods to implement the described functions for each specific application. However, such implementation should not be considered as beyond the scope of the present invention.

The steps of the methods or algorithms described in the embodiments disclosed in this document can be directly implemented by hardware, a software module executed by a processor, or a combination of the both. The software module may be placed in a random access memory (RAM), a memory, a read only memory (ROM), an electrically programmable ROM, an electrically erasable and programmable ROM, a register, a hard disk, a mobile disk, a CD-ROM, or a storage medium of any other form known in the technical field.

The preceding description of the disclosed embodiments enables those skilled in the art to implement or use the present invention. Multiple modifications to these embodiments are apparent for those skilled in the art. The general principle defined in this document can be implemented in other embodiments without departing from the spirit or scope of the present invention. Therefore, the present invention will not be limited to the embodiments described in this document but extends to the widest scope that complies with the principle and novelty disclosed in the document.

What is claimed is:

1. A method for implementing network cognition, comprising:

determining a type of a received network task;
   according to the type of the received network task, selecting at least one cognitive capability identifier corresponding to the type of the network task, wherein the cognitive capability identifier is configured to identify a cognitive capability of a network device;
   using network devices with the at least one cognitive capability identifier as alternative network devices;
   determining that an alternative network device that is among the alternative network devices and has a cognitive capability that meets a condition for performing the network task is a target network device; and controlling the target network device to perform the network task.

2. The method according to claim 1, wherein the at least one cognitive capability identifier comprises: an identifier indicating the cognitive capability of the network device and a level of the cognitive capability.

3. The method according to claim 2, wherein the target network devices are determined according to a following process:

determining, according to an identifier indicating the cognitive capability of the network device and a level of the cognitive capability, that the alternative network device of which a cognitive capability level meets the condition for performing the network task is the target network device.

4. The method according to claim 1, wherein the at least one cognitive capability identifier comprises: an identifier indicating the cognitive capability and a cognitive capability level of the network device; and an identifier indicating a cognitive capability parameter value possessed by the network device.

5. The method according to claim 4, wherein a process of determining the target network devices comprises:

determining, according to the identifier indicating a cognitive capability parameter value possessed by the network device, and the identifier indicating the cognitive capability parameter value possessed by the network device, that an alternative network device of which the cognitive capability level and parameter value meet the condition for performing the network task is the target network device.

6. The method according to claim 1, further comprising: when the cognitive capability identifier of the alternative network device does not meet the condition for performing the network task, stopping the network task, or updating the network task and returning to the step of selecting the at least one cognitive capability identifier corresponding to the type of the network task.

7. The method according to claim 6, wherein the type of the network task comprises: one or a combination of any of a sensing task, a decision task, and a reconfiguration task.

8. The method according to claim 7, wherein the cognitive capability comprises: a sensing capability, a learning capability, or a reconfiguration capability.

9. An apparatus for implementing network cognition, comprising:

a determining unit, configured to determine a type of a received network task;

a cognitive capability identifier selecting unit, configured to: according to the type of the received network task, select at least one cognitive capability identifier corresponding to the type of the network task, wherein the cognitive capability identifier is configured to identify a cognitive capability of a network device;

an alternative device selecting unit, configured to use network devices with the at least one cognitive capability identifier as alternative network devices;

a target device selecting unit, configured to determine an alternative network device that is among the alternative network devices and has a cognitive capability that meets a condition for performing the network task is a target network device; and a controlling unit, configured to control the target network device to perform the network task.

10. The apparatus according to claim 9, further comprising:

a task judging unit, configured to judge, when the cognitive capability identifier of the alternative network device do not meet the condition for the network task, whether the network task needs to be updated;

an ending unit, configured to end the network task when the network task does not need to be updated; and an updating unit, configured to update the network task when the network task needs to be updated.

* * * * *